United States Patent [19]
Son et al.

[11] Patent Number: 5,606,416
[45] Date of Patent: Feb. 25, 1997

[54] LASER GYRO HAVING CONTROLLABLE LOCK-IN ZONE WIDTH

[75] Inventors: Jung Y. Son, Seoul, Rep. of Korea; Yu D. Golyaev; Alexander V. Melnikov, both of Moscow, Russian Federation

[73] Assignee: Korea Institute of Science and Technology, Seoul, Rep. of Korea

[21] Appl. No.: 417,998

[22] Filed: Apr. 6, 1995

Related U.S. Application Data

[63] Continuation of Ser. No. 365,742, Dec. 29, 1994.

[30] Foreign Application Priority Data

Dec. 30, 1993 [KR] Rep. of Korea ............... 93-31237

[51] Int. Cl.6 ................................................ G01C 19/68
[52] U.S. Cl. ............................................................ 356/350
[58] Field of Search ............................... 356/350; 372/94

[56] References Cited

U.S. PATENT DOCUMENTS

| | | | |
|---|---|---|---|
| 4,410,276 | 10/1983 | Ljung et al. | 356/350 |
| 4,526,469 | 7/1985 | Egli et al. | 356/350 |
| 4,686,683 | 8/1987 | Martin | 356/350 |
| 5,359,413 | 10/1994 | Chang et al. | 356/350 |
| 5,463,652 | 10/1995 | Hall | 356/350 |

Primary Examiner—Samuel A. Turner
Attorney, Agent, or Firm—Oblon, Spivak, McClelland, Maier & Neustadt, P.C.

[57] ABSTRACT

Method and apparatus for reducing the errors due to lock-in effect of a ring laser gyro by controlling the intensity of backscattered waves. The intensity of the backscattered waves is controlled by adjusting three of the four ring laser gyro mirrors by means of piezo elements.

12 Claims, 9 Drawing Sheets

LASER GYRO HAVING CONTROLLABLE LOCK-IN ZONE WIDTH

CROSS REFERENCE TO RELATED APPLICATION

This is a continuation of application Ser. No. 08/365,742, filed Dec. 29, 1994.

TECHNICAL FIELD

The present invention generally relates to a ring laser gyro consisting of four mirrors and more particularly, to a method and apparatus for improving lock-in zone width control of a conventional three-mirror ring laser gyro by employing a four-mirror resonator in a ring laser gyro.

BACKGROUND OF THE INVENTION

Laser gyro is broadly used in modern aeronautical industry and well known to the people in the art. The operational principle and use of the laser gyro will be briefly explained herein. In airborne vehicles such as aircrafts or satellite projectiles use Inertia Navigation System(INS) or Inertia Reference System(IRS) to prevent the vehicles from deviating from the navigation target by precisely measuring the errors in navigation path and posture. A core component of this apparatus is a gyroscope which accurately measures the angular velocity due to a change in the posture of the flying object and, thereby corrects the directional error of the object from the direction set to the navigation target.

Laser gyro measures angular velocity of an object by detecting the phase displacement on the basis of Sagnac Effect, which is caused by the difference in the beam paths of forward-propagating wave and reverse-propagating wave propagating through the closed triangular or rectangular propagation channel around the revolving object. Lock-in phenomena, which accounts for the most significant portion of laser gyro error, can be reduced by minimizing the intensity of the counter-propagating waves generated from the backscattering of the mirrors.

Generally, a conventional laser gyro apparatus which incorporates four reflective mirrors actuates two of the four mirrors to control the width of its lock-in zone. To drive the two mirrors, light detectors are employed to continuously monitor the intensity of the reverse-propagating waves. The amount of mirror actuation is determined in proportion to the intensity of the modulated wave included in the propagating waves, and the mirrors are actuated until one of the following conditions is satisfied.

1. Signal amplitude of one of the two light detectors is minimized.
2. Phase displacement between the signals of the two light detectors becomes $\pi$.
3. Signal intensities of the two light detectors are the same.

The two mirrors are actuated to move in such a direction that the circumferential length of the ring resonator remain constant. Thus, if one of the two mirrors moves inwardly toward the center of the ring resonator, then the other one moves outwardly from the center by the same distance. The disadvantage of the prior art described above is that the simultaneous movement of the two mirrors is the only way to control the determining factor of the width of lock-in zone (i.e. location of the light spot on the mirror surface and the distance between the mirrors.) Therefore, a more effective and flexible method and apparatus for minimizing the width of the lock-in zone are required.

To minimize the lock-in phenomena described above, methods for using mirrors of very low scattering characteristics or methods for adjusting the location of gyro mirrors by means of piezo element are widely being used. Apparatus and method for minimizing the effect of lock-in phenomena by offsetting the waves scattered from the mirrors and, thereby minimizing the effect of scattered light are disclosed in U.S. Pat. No. 4,526,469 issued on Jul. 2, 1985. The invention discloses that the waves scattered from mirrors are offset in a gyro having a triangular propagation channel by adjusting the location of the two mirrors by means of piezo elements and adjusting only the phase of the backscattered beam while maintaining the length of closed channel. In the method disclosed, two mirrors aligned with each other are actuated only to move the location of mirror surface without changing the channel length. Thus, control of the location of the two mirrors can be accomplished while maintaining the length of the closed channel constant. On the other hand, in case of the conventional laser gyro having a rectangular channel, lock-in zone is also reduced by adjusting the two mirrors as described above. The present invention, however, discloses a method for minimizing the lock-in phenomena by adjusting three mirrors aligned with each other and increasing the offsetting of the scattered waves thereby.

SUMMARY OF THE INVENTION

The purpose of the present invention is to provide a method and apparatus for minimizing the overall intensity of the backscattered waves generated from a non-ideal mirror surface by adjusting the relative locations of the three mirrors in four-mirror ring resonator and minimizing the laser gyro error caused by lock-in effect by reducing the effect of backscattered waves form the mirrors of ring resonator.

The laser gyro according to the invention comprises a resonator consisting of four mirrors, three of which can be driven by a actuator attached thereto and the remaining one has two light detectors attached thereto; an amplifier for amplifying the signal from light detectors; a converter for converting the amplified signal; and a controller for supplying an actuation signal to the piezo actuator to adjust the mirrors by a predetermined distance in response to the signal from the converter.

The features and advantages of the present invention will be more clearly understood from the following detailed explanations referring to the attached drawings.

DETAILED EXPLANATION OF THE INVENTION

Figure 1:
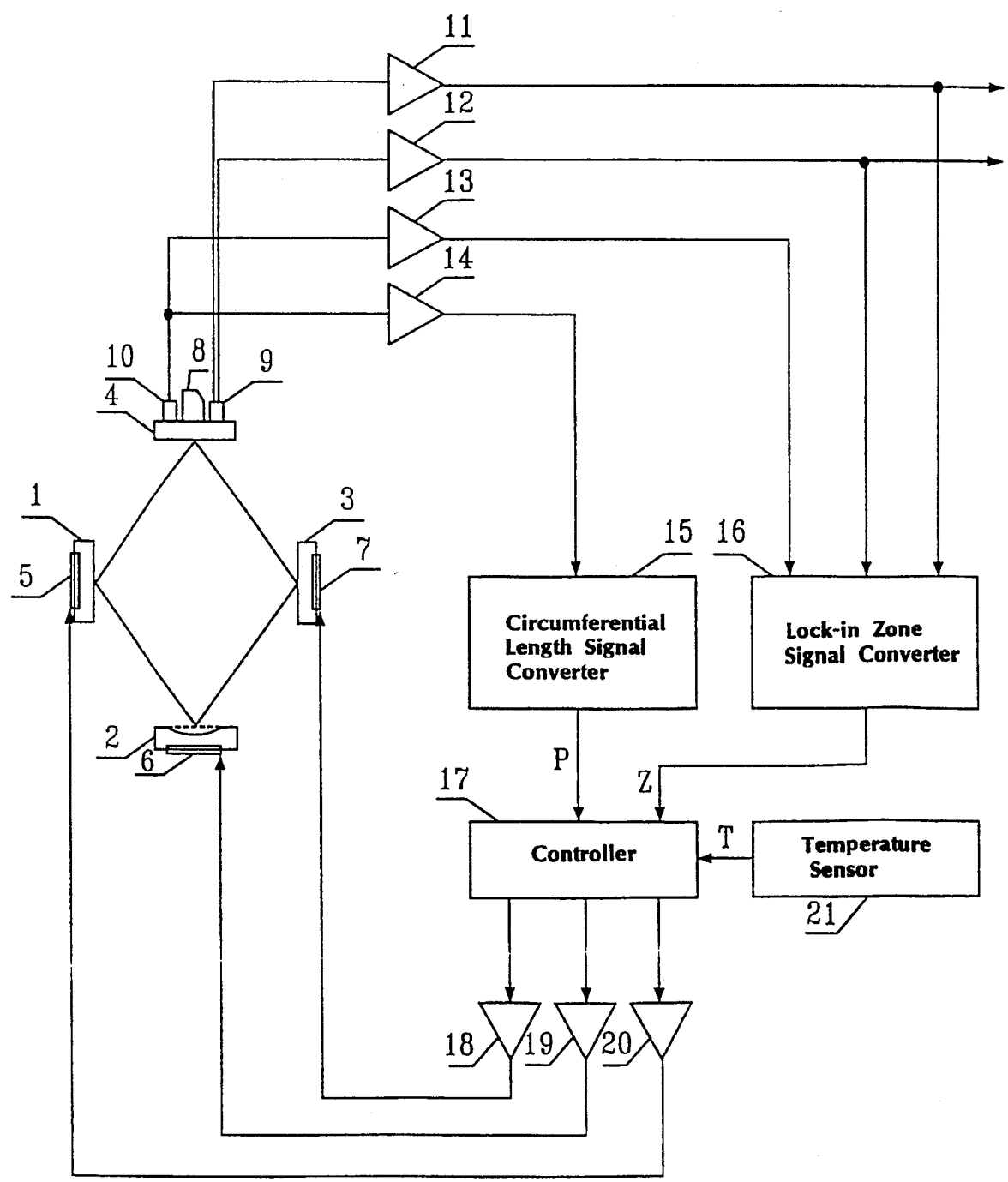
FIG. 1 is a schematic illustration of the construction of a laser gyro according to the invention.

FIG. 1 to FIG. 5 show the schematic construction of a laser gyro according to the invention, and particularly FIG. 1 shows the overall construction of laser gyro which can control the width of lock-in zone. Laser gyro resonator comprises four mirrors. Of the four mirrors, three are flat surface mirrors 1, 3, 4 and the remaining one is a concave mirror 2. Mirrors 1, 2, 3 are actuated by piezo actuators 5, 6, 7. Mirror 4 receives part of two waves traveling in opposite directions to each other and guides them into a coupling prism attached to the back of the mirror. Coupling prism couples two incident waves traveling in opposite directions to each other and send them to light detectors 9, 10. Output signals of the light detectors 9, 10 are amplified by corresponding amplifiers, and they are sent to a controller 17 after being converted by converters 15, 16.

Controller 17 generates three DC voltage outputs and sends them to piezo actuators which drive the mirrors to appropriate positions. Temperature sensor 21 is used to adjust the mirror position in advance.

Figure 2:
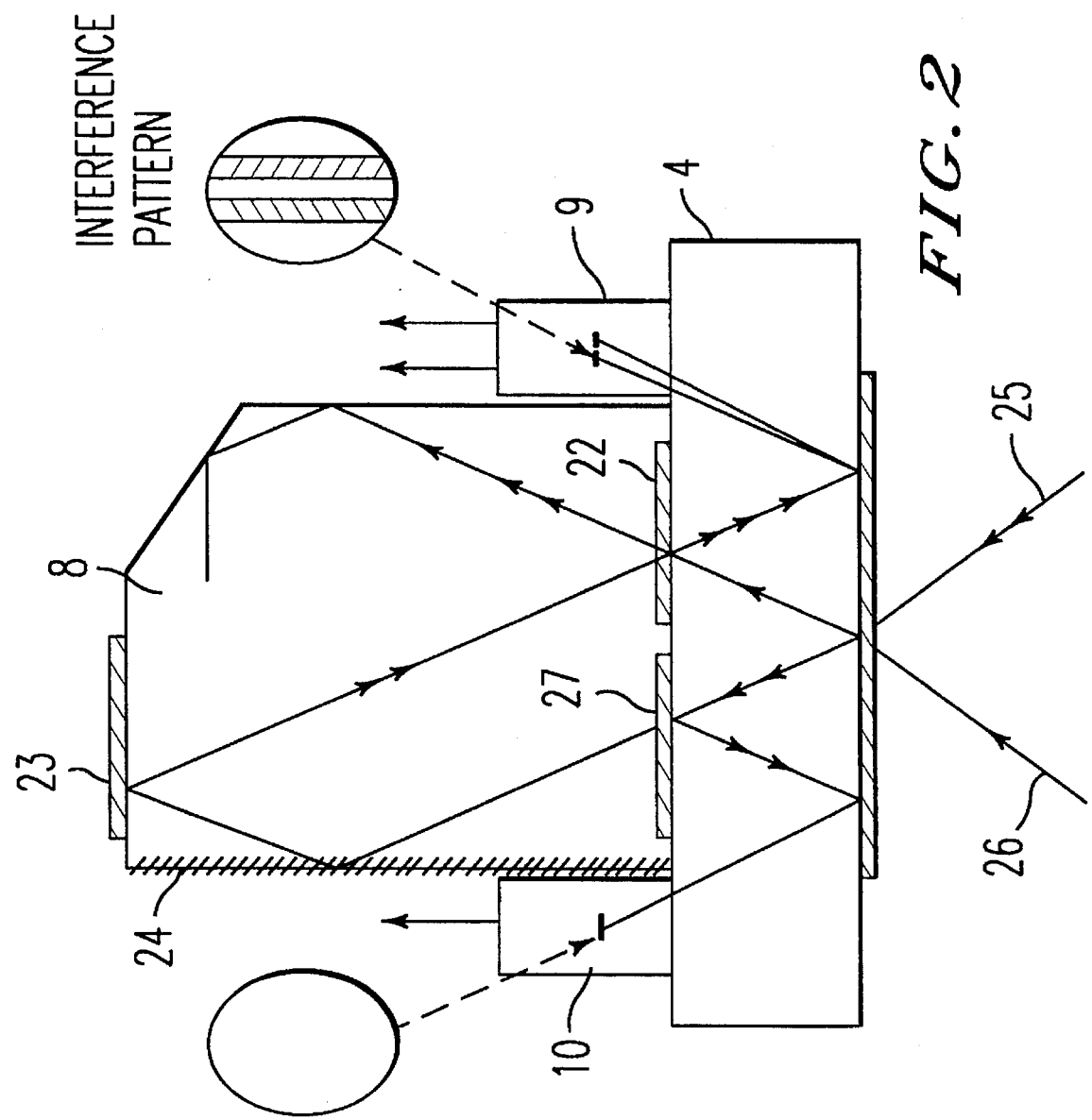
FIG. 2 is an illustration showing the operation of a beam coupling prism used in the laser gyro of FIG. 1.

FIG. 2 provides a detailed illustration of a coupling prism 8 and two light detectors 9, 10 attached to the back of mirror 4.

The coupling prism comprises semitransparent coating films 22, 27, prism surface 24 causing internal total reflection of light, and reflective coating film 23 which causes almost 100% reflection of light and makes the light waves 25 and 26 interfere with each other. About 10% of the incident light intensity reaches light detector 10 owing to the semitransparent coating 27 on the mirror 4.

Light detector 9 consists of two light detecting portions. These light detecting portions are separated by such a distance that the phase displacement between the sinusoidal wave output signals of each detecting portions is $\pm\pi/2$. The notation $\pm$ indicates the revolving direction of laser gyro. The frequency of the sinusoidal signal of the light detector is proportional to the angular velocity of laser gyro.

The output signal of the light detector 10 has a low-frequency component and a high-frequency component. The amplitude of the low-frequency component of the signal is proportional to the deviation value of the circumferential length of the resonator from the length corresponding to the center of gain curve. Low frequency signal is amplified by an amplifier 14 which exclusively selects and amplifies the low frequency signal, and then is converted into a DC voltage p by a signal converter 15. Eventually, the DC voltage P controls the circumferential length of the resonator by means of a piezo actuator. On the other hand, the amplitude of the high frequency component is proportional to the width of the lock-in zone. The frequency of the signal is equal to the frequency difference between the waves traveling in opposite directions to each other in the oscillator.

Figure 3:
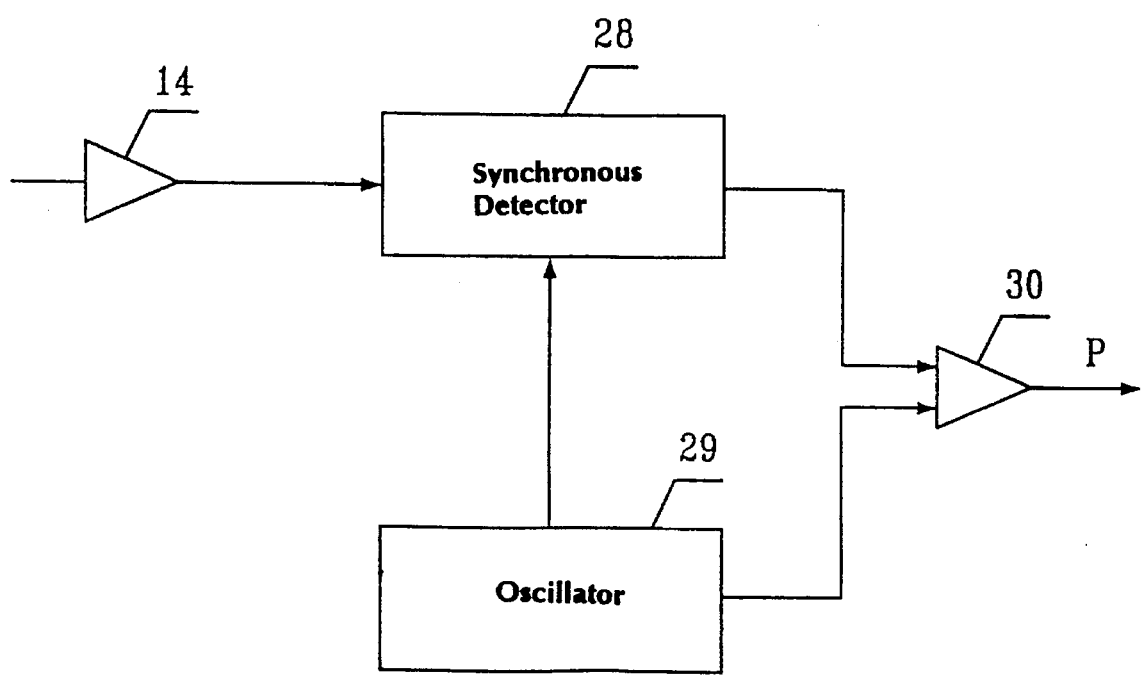
FIG. 3 is a schematic diagram showing the operation of a circumferential length signal converter used in the laser gyro of FIG. 1.

FIG. 3 illustrates a circumferential length signal converter (15 in FIG. 1) comprising a synchronous detector 28, an oscillator 29 generating a low frequency sinusoidal wave used as a reference signal, and a summation amplifier 30.

The output signal of the amplifier 14 is coupled with the reference signal in the synchronous detector 28. The output of the synchronous detector is coupled with the reference signal in the amplifier 30 in order to send a circumferential length control signal (DC voltage P) to the controller 17.

Figure 4:
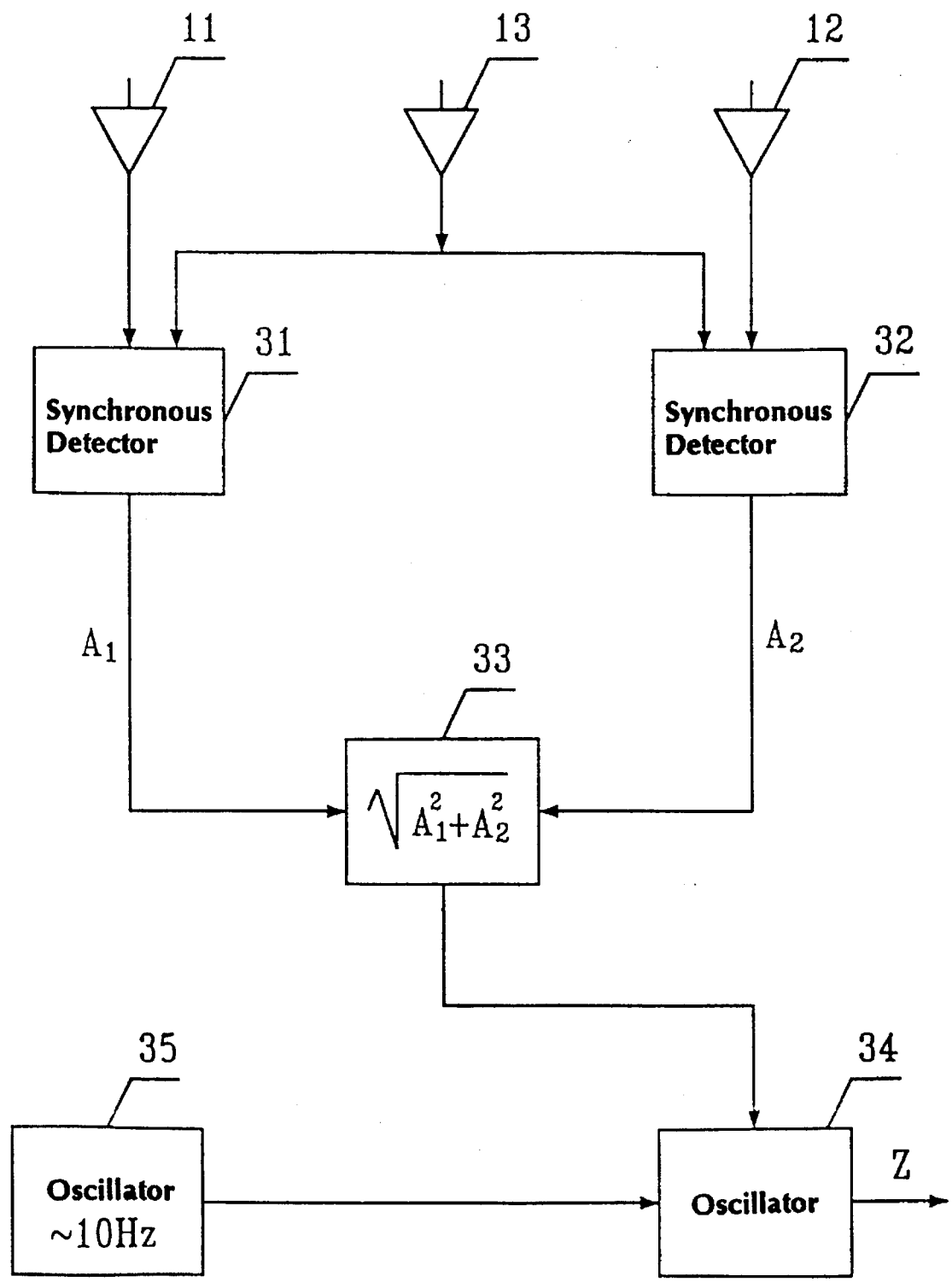
FIG. 4 is a schematic diagram showing of the operation of a lock-in zone signal converter used in the laser gyro of FIG. 1.

FIG. 4 illustrates a lock-in zone signal converter (16 in FIG. 1) comprising three synchronous detectors 31, 32, 34, a low frequency (~10 Hz) oscillator 35, and a converting element 33.

The output signal from the amplifier 13 is fed into two synchronous detectors 31, 32 of the same characteristics, and coupled with the output signals from the amplifiers 11, 12. The outputs $A_1$ and $A_2$ of synchronous detectors 31, 32 are fed into a converting element 33, and the converting element outputs $\sqrt{A_1^2+A_2^2}$ This output signal is imposed on the synchronous detector 34 with the reference sine wave from oscillator 35, and generates a lock-in zone signal Z which is supplied to the controller 17.

Figure 5:
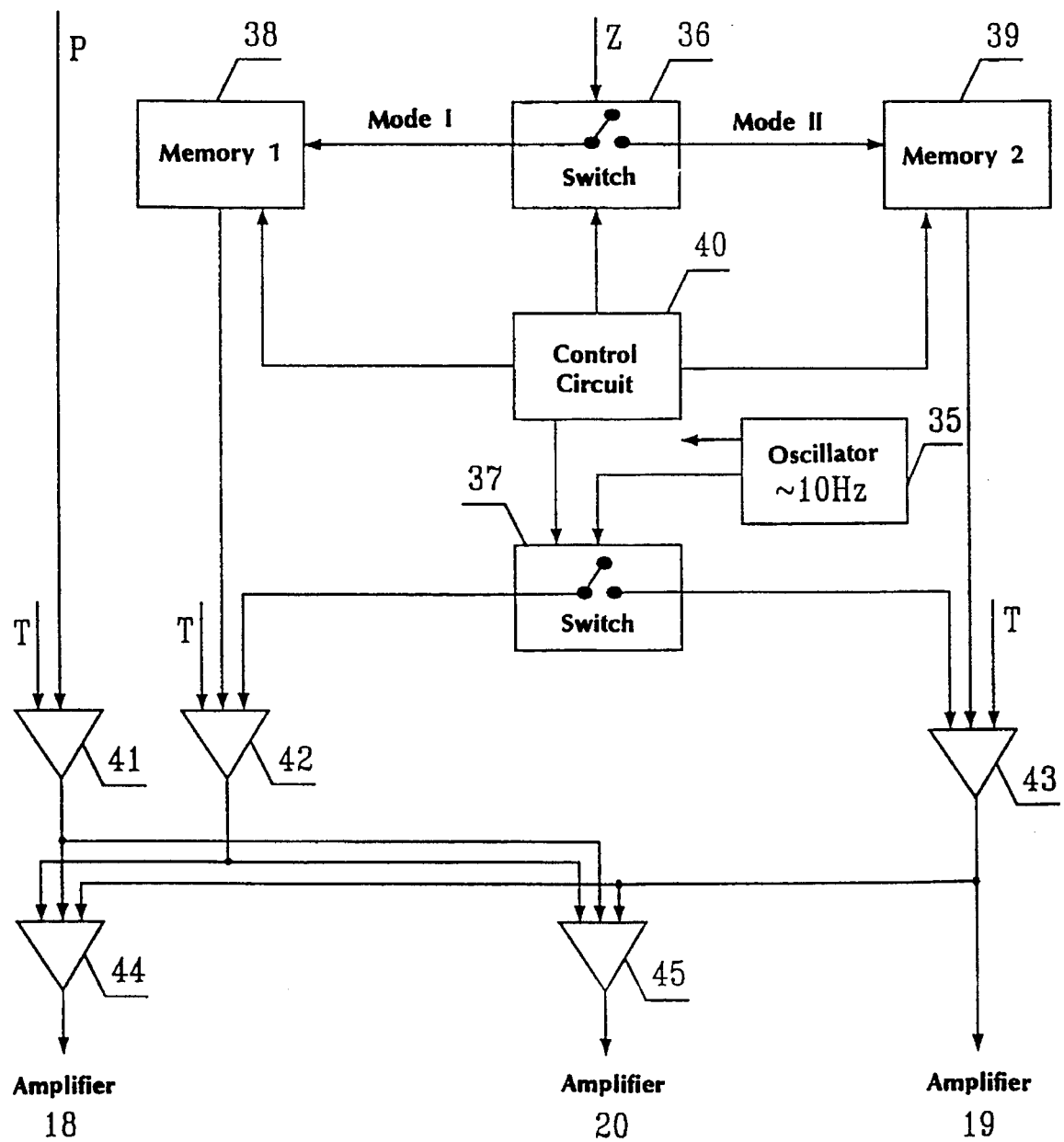
FIG. 5 is a schematic diagram showing the operation of a controller use in the laser gyro of FIG. 1.

As shown in FIG. 5, the controller 17 consists of two switches 36, 37, two memory devices 38, 39, a control circuit 40, and five summation amplifiers 41, 42, 43, 44, 45. The controller receives the resonator circumferential signal P from amplifier 30, the lock-in zone signal Z from the synchronous detector 34, the sine wave from the oscillator 35, and a temperature signal T from the other circuit component.

The temperature signal adjusts the location of the mirrors in advance in order to adjust the mirror position optimally before the operation of the laser gyro starts. After the adjustment, the temperature signal is switched off.

Resonator circumferential length signal P is amplified by a summation amplifier 41. The output of the amplifier 41 is imposed upon summation amplifiers 44, 45 together with the output signals of amplifiers 42, 43. The output signals of amplifiers 44, 45 are fed into the amplifiers 18, 20 to control the piezo actuators 5, 7.

Depending on the switch positions determined by the control circuit 40, lock-in zone signal Z is fed into either memory device 1 or memory device 2, and then the signal is coupled with the sine wave signal from the oscillator 35. Output signals of memory device 1 and 2 are fed into amplifier 42 and 43, respectively. The output of amplifier 42 is connected to amplifiers 44, 45, and the output of amplifier 43 is coupled to amplifiers 19, 44, 45 in order to adjust the mirrors by actuating the piezo drivers 5, 6, 7 (FIG. 1). Switches are operated synchronously by the control circuit 40.

FIG. 6 to FIG. 9 show the operational principle of a laser gyro controlling a lock-in zone according to the present invention.

Figure 6:
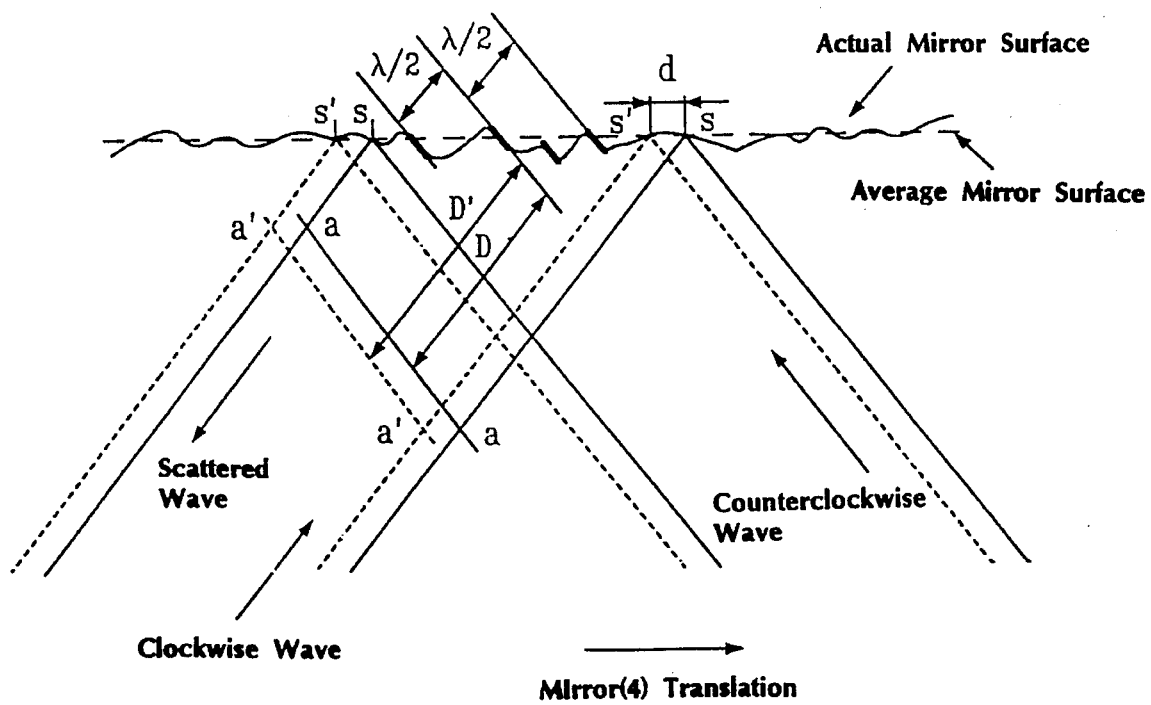
FIG. 6 is an illustration showing the formation of backscattered waves by the irregularities on a mirror surface.

As shown in FIG. 6, a lock-in effect takes place due to the scattering of an Eigenwave in a ring resonator due to nonuniformity of the mirror surface. Owing to the nonuniformity of the mirror surface, some portions of the mirror surface may coincide with the wave front of the forward propagating wave, and some portions of the surface may be separated from the wave front by the distance of $\lambda/2$ ($\lambda$ is the wavelength of the reverse-propagating wave.) In this case, backscattered waves from the portions has a phase displacement of $\lambda$ relative to the forward-propagating wave. The intensity of the scattered wave is about 1/106 of the intensity of the forward-propagating wave. Phase angle of the scattered wave over any section a—a is determined by the distance D in FIG. 6.

Figure 7:
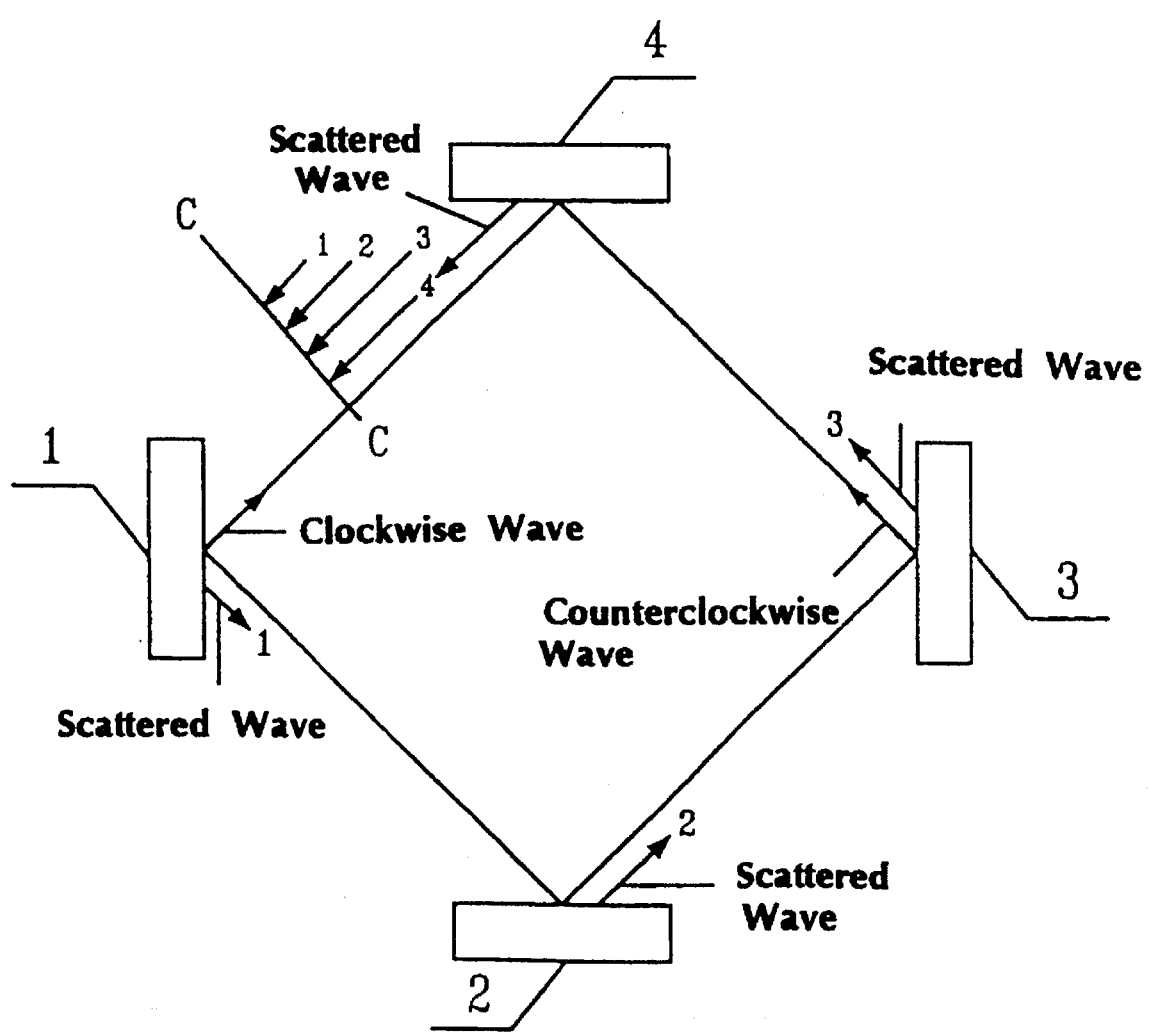
FIG. 7 is an illustration showing the formation of the backscattered waves in a four-mirror resonator.

Referring to FIG. 7, if the scattering patterns of the four mirrors are the same, the coupled scattered wave is obtained from the vectorial summation of the backscattered waves from the four mirrors. The frequencies of the four backscattered waves are other. Also, the phase angles of the scattered waves are different over any interval c—c.

Figure 8:
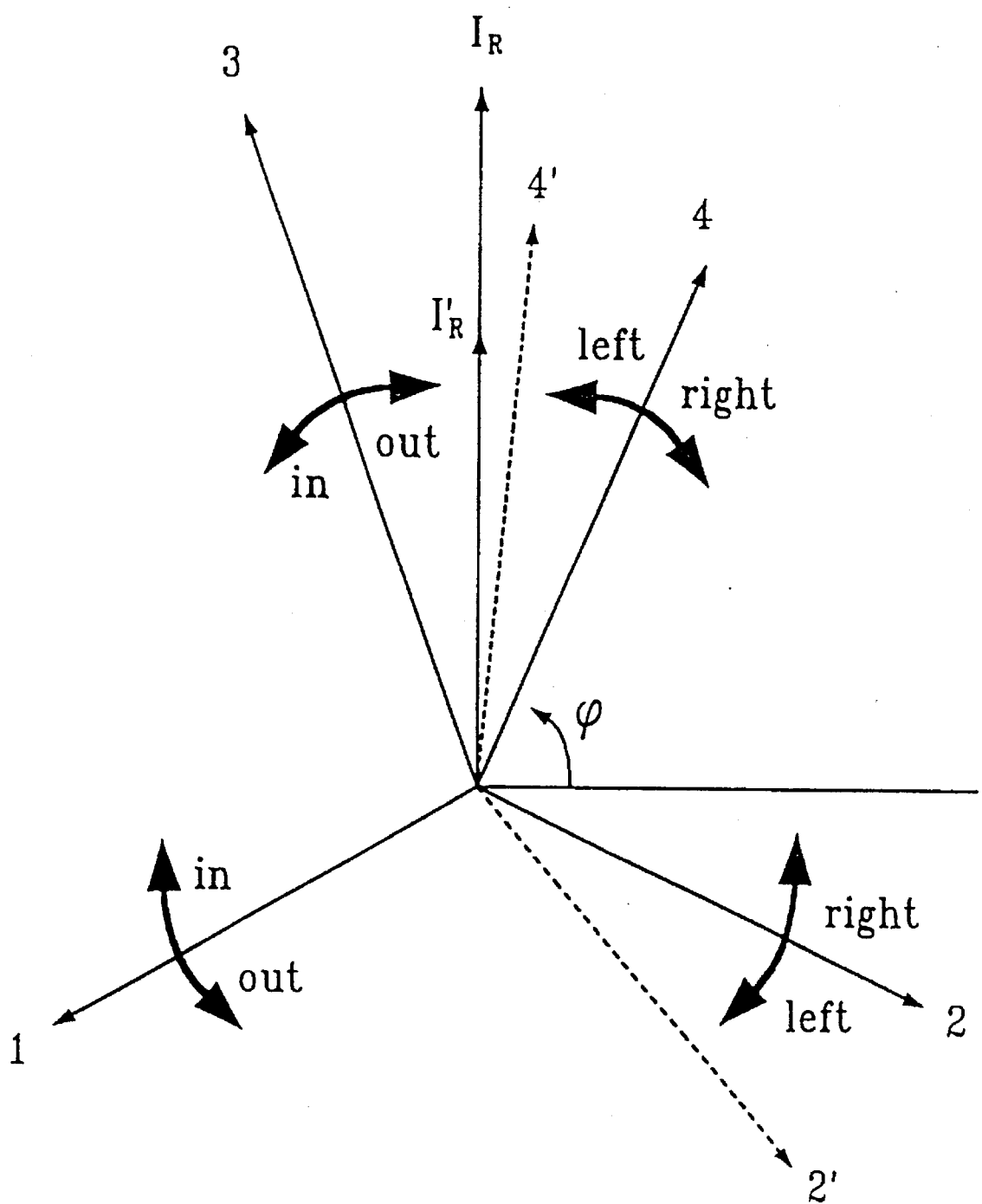
FIG. 8 is an illustration showing the vectorial coupling of the backscattered waves in a four-mirror resonator.

FIG. 8 shows the vectorial relation between four backscattered waves. Scattered waves are assumed to have a phase w relative to the reference axis X at the initial stage. The interaction between the coupled scattered wave $I_R$ and the reverse-propagating wave is the major cause of the lock-in effect. As the intensity of the scattered wave $I_R$ increases, the width of lock-in zone becomes wider.

In the present invention, the reason for moving the light spot on the surface of the mirrors is to vary the phase of scattered waves and to reduce $I_R$ as much as possible. In FIG. 6, if the mirror (4 in FIG. 1) moves to the right, the location of the light spot moves from S to S'. As the result of this movement, the intensity and phase of the scattered wave 4 varies, but the intensity and phase of the remaining scattered waves 1, 2, 3 remain the same. Consequently, the phase and intensity of the coupled scattered waves are varied by the backscattered waves from mirror 4.

Figure 9A:
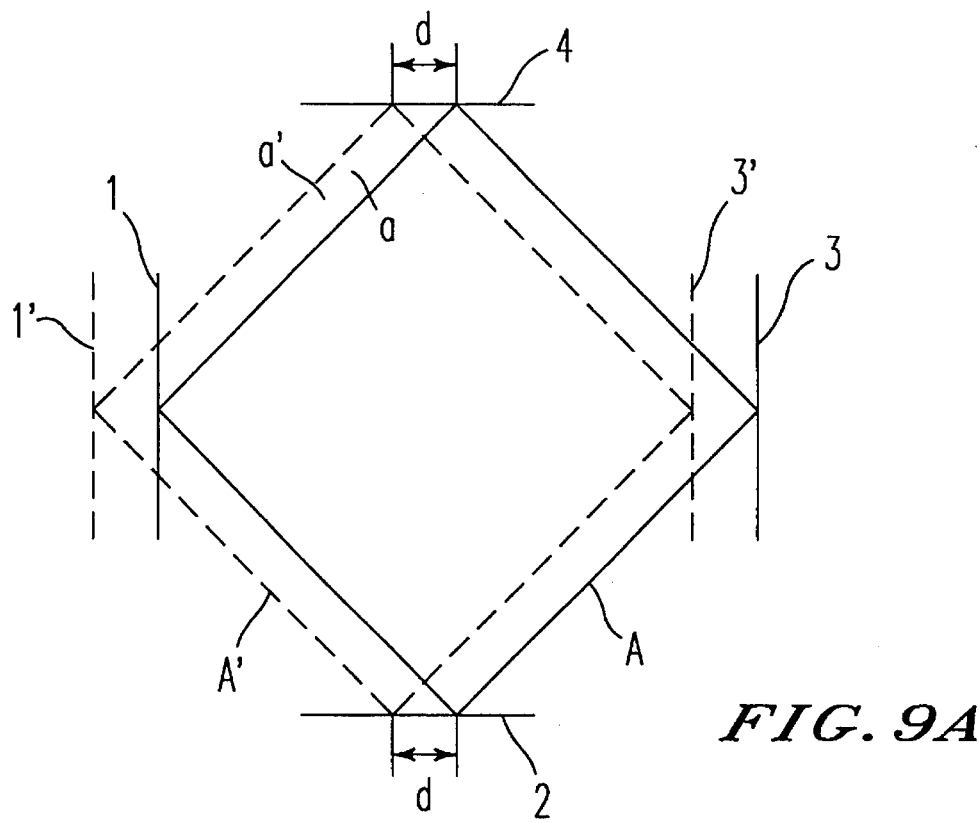
FIG. 9a & b are illustrations showing the two patterns of mirror movement to control the width of lock-in zone.
Figure 9B:
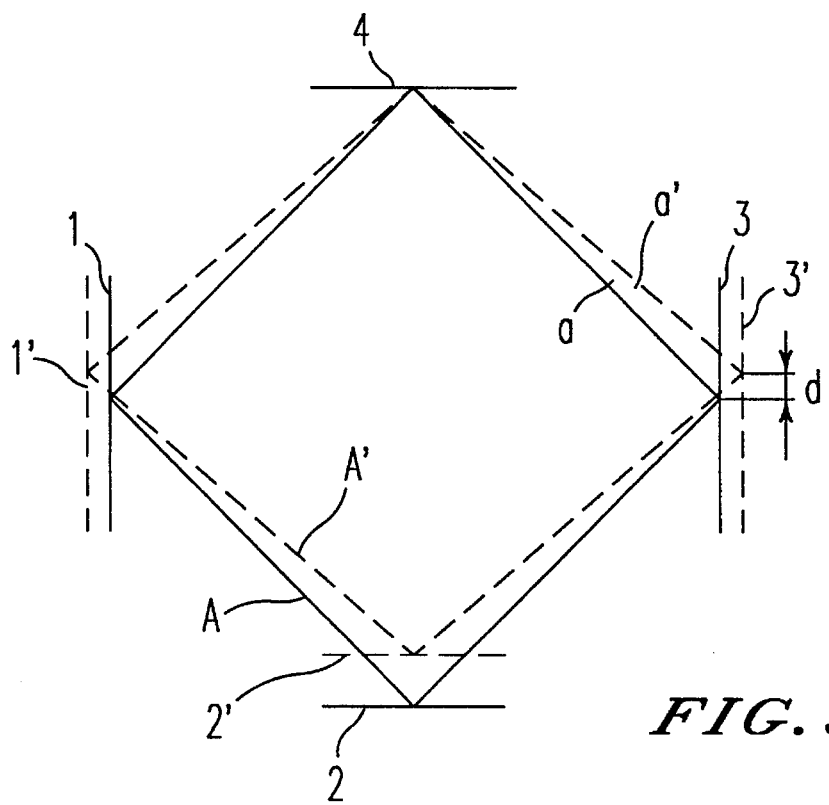

As shown in FIG. 9(a) and FIG. 9(b), mirrors are actuated in two modes. In both modes, the circumferential length of the resonator is maintained to be constant. In mode I, depicted in FIG. 9(a), mirrors 1, 3 translate in parallel with each other in the directions of right or left. If the mirrors 1, 3 translate to the left, seen from the forward propagating wave, it appears that mirror 2 translates to the right and mirror 4 translates to the left. Thus, as shown in FIG. 6, the light spot on mirrors 2, 4 moves to the left with respect to mirror 4 and to the right with respect to mirror 2. As shown in FIG. 8, the movement of the light spot on the mirrors changes the phase of backscattered waves from mirrors 2,4. The terms of "right" and "left" in FIG. 8 indicate the translational direction of mirrors 1, 3.

In mode II, the movement of the light spots on the surface of mirrors 1,3 is accomplished by translating mirror 2 toward or from the center of the resonator as depicted by solid lines in FIG. 9(b).

To maintain the circumferential length of the resonator constant, mirrors 1, 3 translate in opposite directions, i.e. "in" and "out" of the resonator. Inward or outward translation of the mirror 2 causes the phase of the backscattered waves from mirror 1, 3 to vary. "in" and "out" in FIG. 8 coincide with the direction of inward and outward translation of mirror 2, respectively.

Below, the operation of a laser gyro according to the invention will be explained. Upon application of power to the apparatus, mirrors 1, 2, 3 are positioned to the locations which minimize the width of lock-in zone in response to the signals from the temperature sensor. When the controller is switched on and begins to operate, mirrors 1, 3 begin to translate in opposing directions vertical to the mirror surfaces maintaining the circumferential length which is a multiple of the wavelength constant. Then, during the operation period of the controller, mirrors 1, 2, 3 continue to be translated while periodically changing modes of actuation between mode I and mode II until the output signal from signal converter 16 becomes 0 (Z=0). Preferably, the period of mode change is several seconds. When the condition Z=0 is accomplished, piezo actuator driver receives no more signal. The average locations of mirrors determined during the previous operation period of mode I and II are stored in memory 38, 39.

In a laser gyro according to the present invention, the error of ring laser gyro caused by the lock-in effect can be effectively reduced by controlling the intensity of the backscattered waves generated from the mirrors of laser gyro.

It should be understood that those skilled in the art can modify, change and substitute the disclosed embodiments of this invention variously without departing from the scope of the invention, and those modification, change and substitution fall within the scope of the appended claims.

We claim:

1. Apparatus for controlling the width of a lock-in zone in a laser gyro, comprising:

light resonating means including four mirrors, wherein three of said four mirrors are actuated by means of piezo actuators attached thereto and the other mirror has a coupling prism and two light detectors attached thereto;

amplifying means for amplifying signals from said light detectors;

signal converting means for converting said amplified signals into a circumferential length signal and a lock-in zone signal Z; and a controller for receiving converted signals from said converting means and supplying actuation signals to said piezo actuators to translate said mirrors by determined distances.

2. The apparatus of claim 1 wherein said coupling prism is a rectangular coupling prism comprising a first surface with semitransparent coating films, a second and third surface parallel to each other causing total reflection of incident light, and a forth surface coated with a reflective film.

3. The apparatus of claim 1 wherein one of said two light detectors comprises two separate light detecting portions and the other one comprises one light detecting portion.

4. The apparatus of claim 3 wherein said amplifying means comprises, a narrow band amplifier for amplifying the low frequency component of the signal from said detector having one light detecting portion; and three wide band amplifiers for amplifying the high frequency component of the signal from said detector having one light detecting portion and the two signals from the other said detector, respectively.

5. The apparatus of claim 1 further comprising three amplifiers for amplifying the actuation signal from said controller.

6. The apparatus of claim 1 wherein said signal converting means comprises, a circumferential length signal converter comprising a synchronous detector, oscillator and a summation amplifier; and a lock-in zone signal converter comprising
a first and second synchronous detector each having an input for receiving a reference signal, said reference signals of the detectors having a phase difference of π/2 each other,
a converting element for receiving output signals $A_1$, $A_2$ from the outputs of said synchronous detectors and for converting the received signals into an output of $X=\sqrt{A_1^2+A_2^2}$; and
a third synchronous detector receiving an input signal from the output of said converting element.

7. The method for controlling the width of a lock-in zone in a ring laser gyro, comprising the steps of;

coupling two waves traveling in an opposite direction to each other in a four-mirror resonator by means of a coupling prism;

generating detection signals from two light detectors out of the coupled waves guided into the light detectors;

amplifying the detection signals of said two light detectors;

converting a circumferential length signal P, and a lock-in zone signal Z from the output of said two light detectors;

generating an actuation signal in a controller from the circumferential length signal P, lock-in zone signal Z, and temperature signal T; and actuating three mirrors of said ring gyro in response to said actuation signal.

8. The method of claim 7, wherein said coupling is accomplished by means of a rectangular coupling prism comprising a first surface coated with semitransparent coating films, a second and third parallel surfaces causing total reflection of incident light, and a forth surface coated with reflective film.

9. The method of claim 7, wherein said detection signals are generated by two light detectors, one of the two detectors comprising two separate light detecting portions and the other one comprising only one light detecting portion.

10. The method of claim 7, wherein said amplifying step is accomplished by amplifying means comprising a narrow band amplifier and three wide band amplifiers and said converting means comprises a circumferential length signal converter and a lock-in zone signal converter.

11. The method of claim 7, wherein said signal converting step comprises the steps of:

converting the circumferential length signal P by a circumferential length signal converter comprising a synchronous detector, an oscillator and a summation amplifier;

converting the lock-in zone signal Z by means of the lock-in zone signal converter comprising two synchronous detectors each having an input for receiving a reference signal, said reference signals of the two detectors having a phase difference of $\pi/2$ with each other, a converting element for receiving output signals $A_1$, $A_2$ from the outputs of said synchronous detectors and for converting the received signals into an output of $X = \sqrt{A_1^2 + A_2^2}$, and a third synchronous detector receiving an input signal from the output of said converting element.

12. The method of claim 7, wherein said actuating step translates the three mirrors of said ring gyro in two alternating modes by means of piezo actuators.

* * * * *